United States Patent Office 3,126,277
Patented Mar. 24, 1964

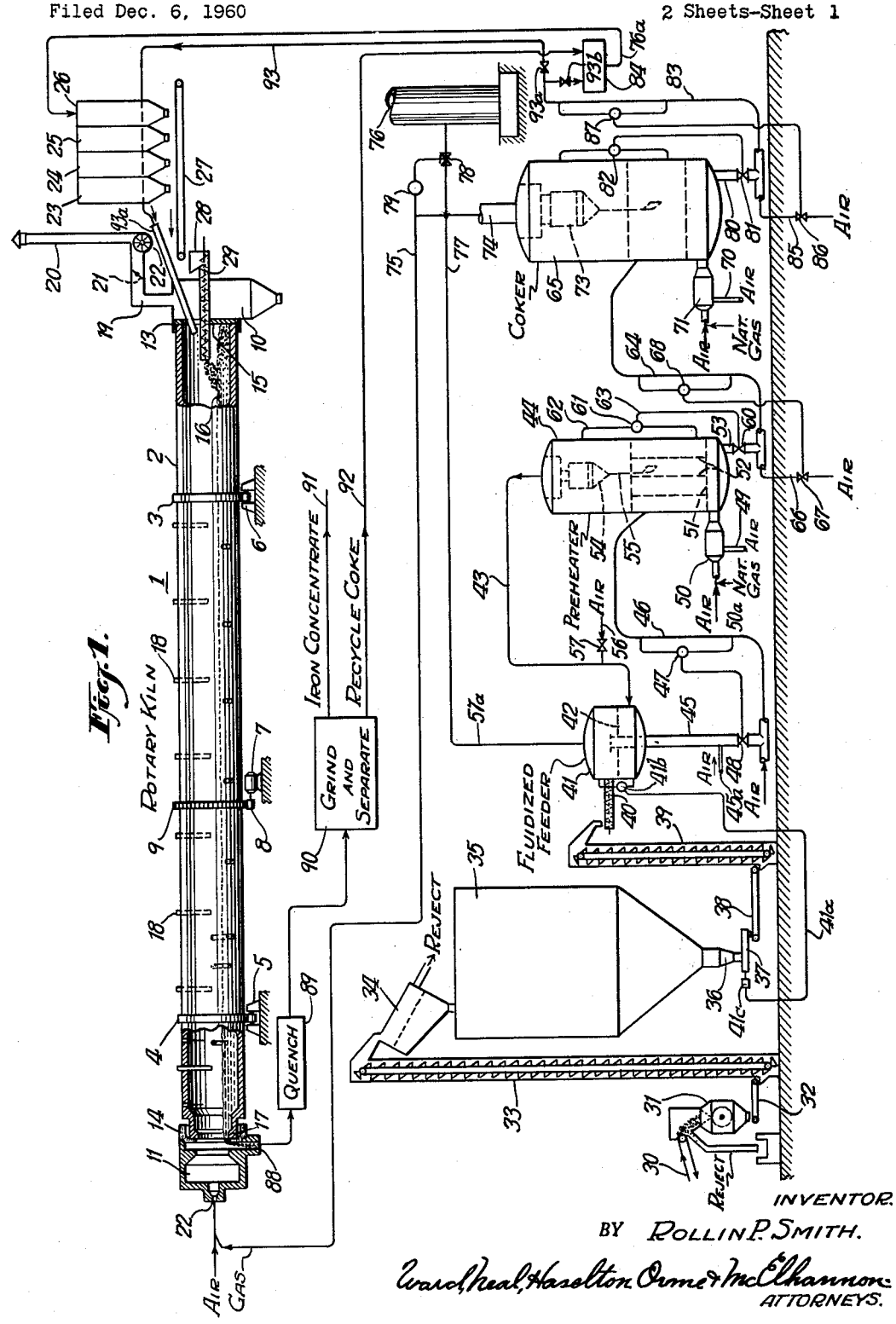

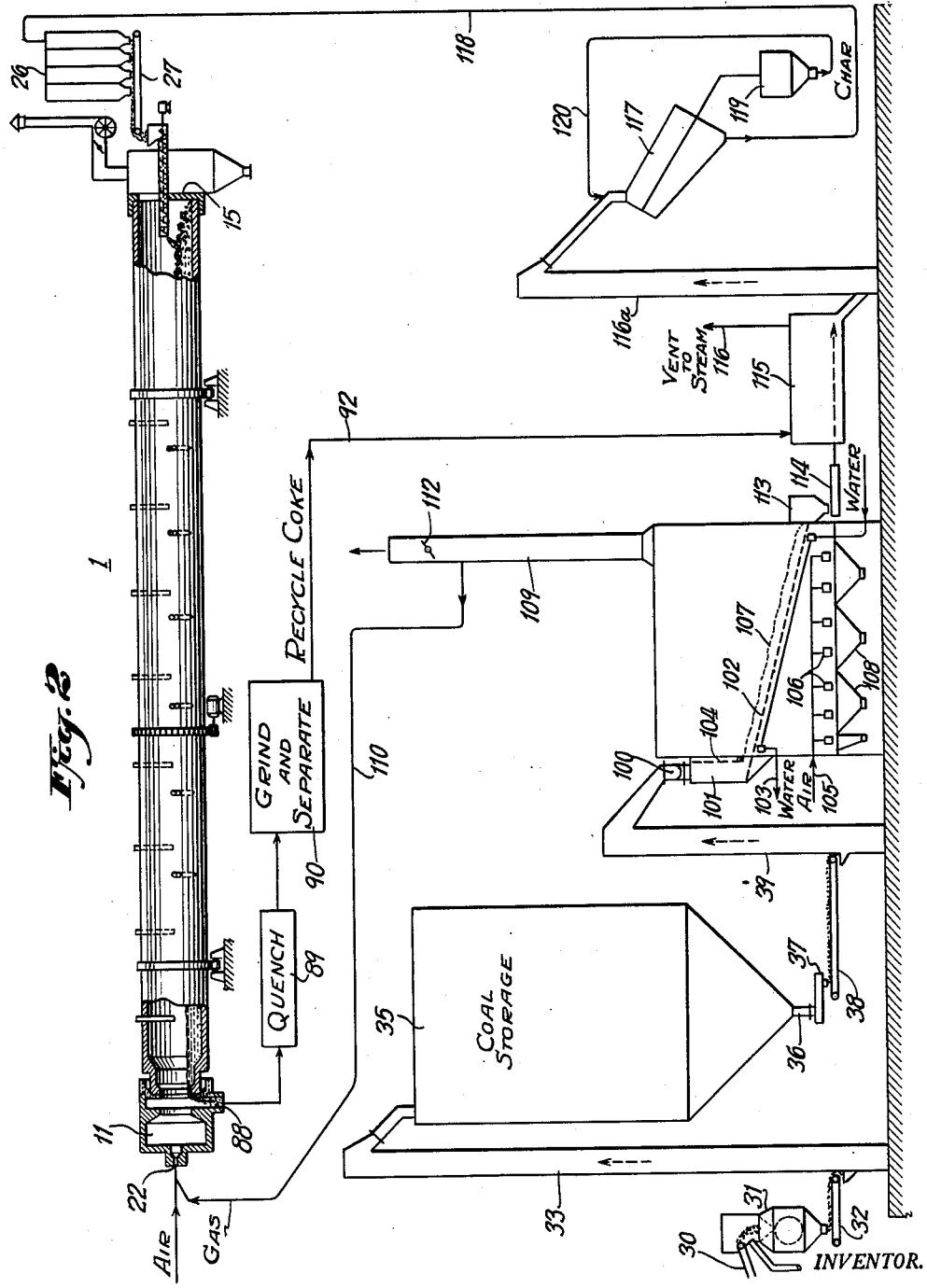

3,126,277
ORE REDUCTION PROCESS
Rollin P. Smith, New Canaan, Conn., assignor to R-N Corporation, New York, N.Y., a corporation of Delaware
Filed Dec. 6, 1960, Ser. No. 74,185
4 Claims. (Cl. 75—36)

This invention pertains to the direct reduction of iron ores and the like without fusion in the presence of hot combustible gases and solid carbonaceous fuel, and provides improved processes therefor wherein the sensible heat values as well as the chemical heat values of the hot combustible gases and the hot char resulting from the charring of coal are utilized in reduction of the ore.

In processes as heretofore practiced using solid reducing agents for low temperature ore reduction, ore and carbonaceous matter are usually mixed and heated up to reaction temperature. As the reaction temperatures are generally higher than the temperatures required for volatilization of the volatile matter contained in the reducing agent, these volatiles are usually lost to the process proper. Because the ore-carbon mixtures are heated up in counter current, the volatile matter is distilled off at a temperature where its combustion is not needed and where its reducing power is not effective due to the low temperature. In these processes, therefore, the volatile matter can only be utilized outside the reactor, for instance, by combustion. Thus, most of the solid reductant processes prefer to use coke, coke breeze or low volatile anthracites rather than high volatile coals. However, in visualizing large commercial installations, the availability of low cost coke or coke breeze in sufficient quantities presents a serious problem, whereas coal is widely available at relatively low cost.

In order to provide for the efficient utilization of coal in low temperature, solid fuel reduction processes of the character aforesaid, it is proposed in accordance with this invention to integrate with the ore reduction furnace, method and means external thereto for charring coal, the hot combustible gases from which are piped directly into the furnace to provide the required hot combustible furnace atmosphere and the hot char from which may also be fed directly into the furnace along with the ore for preheating the same and thereby expediting the reduction. The invention is equally applicable to the utilization of non-coking as well as coking coals for purposes aforesaid.

In this way the sensible or physical heat which is derived from the charring of the coal, is conserved and utilized along with the chemical heat of the char gas and char, in the ore reduction process. Also relatively low cost coal is employed in contrast to the relatively expensive and separately prepared coke or coke breeze of prior processes.

The invention is especially adapted to progressive ore reduction in a rotary kiln type of furnace, since the rate of charring of the coal in the integrated charring process may be adjusted to conform to the hot char gas or hot char requirements of the kiln, or both. An especially efficient construction and mode of operation of such a kiln is described in U.S. Patent 2,829,042, to O. Moklebust, incorporated by reference herein and discussed below.

As applied to such rotary kiln ore reduction operation, the hot char gas is fed directly from the charring unit to the burner of the kiln combustion chamber. The hot char from the char unit may also be fed directly into the opposite or feed end of the kiln along with the crushed ore; or alternatively may be admixed with the wet recycle coke therefrom for purposes of drying the same while supplying the replacement coke required for continuous operation.

Although various charring processes may be employed in conjunction with the rotary kiln ore reduction, a fluidized bed or vibrating grate type of charring process is particularly adapted for integration therewith, since both processes utilize coal in continuous and progressive charring, and are adjustable to meet the kiln requirements for hot combustible gases and also can provide char of the degree of fineness that may be fed directly into the kiln along with the crushed ore and recycle coke or, alternatively, may be blended with the wet recycle coke derived from the kiln discharge.

Having thus described the invention in general terms, reference will now be had for a more detailed description to the accompanying drawings wherein:

FIG. 1 is a more or less schematic or diagrammatic showing of one preferred embodiment of the invention, wherein a fluid bed coal charring method and apparatus is integrated with a rotary kiln ore reduction method and apparatus of the type described in the aforesaid Moklebust patent. FIG. 2 is a similar showing of a second preferred embodiment wherein a vibrating grate charring method and apparatus is integrated with the rotary kiln reduction method and apparatus of FIG. 1.

Referring to FIG. 1, the rotary kiln construction, shown generally at 1, comprises an elongated tubular kiln 2, provided with a pair of spaced bearing rings, 3, 4, circumscribing the same, for rotatably supporting the kiln on rollers journaled to bearing supports, as at 5, 6. The kiln is rotated by a motor 7, to the shaft of which is keyed a pinion 8, meshing with a ring gear 9, mounted on the kiln and extending thereabout.

Disposed at the opposite ends of the rotary kiln 2, are stationary housings 10, 11, comprising, respectively, a feed end housing at the feed end, and a precombustion chamber housing at the discharge end. Both ends are equipped with special, fluid-tight, water cooled seals between the rotary kiln and housings, as at 13, 14.

At the feed end and fastened to the feed end housing 10, is mounted a stationary kiln charge retaining plate 15, covering about one-half the kiln radial area, which permits the kiln to be operated with a high kiln load 16, without back spillage and with a maximum exit gas opening for the kiln gases. At the discharge end there is a retaining dam 17 for the kiln load, insuring a relatively deep bed depth in this part of the kiln. In the rotary kiln 2, are mounted at longitudinally and radially spaced intervals, a series of air inlet tubes, as at 18, which extend from the exterior to the axis thereof. The exterior ends of these tubes are fitted with valves while the inner ends are provided with openings which are directed co-directional with the flow of gases in the kiln, for controlling the temperature and combustion conditions throughout the kiln, as described in said Moklebust patent. The feed end housing 10 is connected by a duct 19 to a stack 20. A damper 21 and blower 22 in this duct control the draft in the kiln.

The pre-combustion chamber 11 is provided with a burner 22 for inspiration of air and combustion gases in adjustably regulated admixture. At the feed end, surge bins 23–26 are provided for storage of ore, limestone, fresh coke and recycle coke, respectively, the discharge from which is fed by a belt conveyor 27, into a hopper 28, and thence by a screw conveyor 29 into the kiln 2, the hopper and screw conveyor being carried by the feed end housing 10 as shown.

The fluid bed apparatus for coking coal is shown in the lower portion of FIG. 1, referring to which the coal as prepared by crushing in a hammer mill (not shown) which reduces it to a size passing 100% through a ⅛″ screen, is conveyed by belt 30, to a magnetic separator 31. From thence the coal concentrate is conveyed by belt 32 and bucket elevator 33 to a screen 34 and thence into a surge bin 35. The thus prepared coal is fed from the base of this bin through a bin valve 36 onto a weight feeder 37. A belt conveyor 38 and bucket elevator 39, convey the coal thence to a screw feeder 40, which pushes the coal against slight back pressure into a fluidized feeder 41. A control line 41a extending from a level controller 41b on the fluidized feeder, to a control valve 41c on the weight feeder 37, automatically controls the rate at which the coal is fed into the fluidized feeder 41. A grid 42 is provided in the fluidized feeder to support the fluidized coal as it passes through the vessel, wherein the fresh coal is heated and partially dried by contact with gases heated to approximately 750° F. supplied over a conduit 43 extending from a pretreater 44, as described below.

The fluidized, dried coal, heated to about 160° F. by the hot gases from the pretreater, passes from the fluidized feeder 41, into a standpipe 45, of sufficient height to provide a hydrostatic head of several pounds per square inch (p.s.i.). Air under pressure is introduced into the standpipe at 45a, for establishing and maintaining the fluidized bed in the fluidized feeder 41. From the base of the standpipe, the fluidized coal is conveyed through a transport conduit 46 into the pretreater 44. A pneumatic differential pressure controller 47, connected to conduit 46 and measuring the density of the coal and air mixture, operates a slide valve 48, at the base of the standpipe 45, to regulate the flow of the fluidized coal through conduit 46 and into the pretreater 44.

In the pretreater, the coal is oxidized with a flow of air supplied through a conduit 49, and preheated to 750° F. by an in-line heater 50, which is heated by combusting an admixture of air and natural gas introduced at 50a. A grid 51 is provided in the pretreater to support the fluidized coal bed. Also vertically extending baffles 52 are provided therein, mounted in staggered relation to increase the path of flow of the fluidized coal from the inlet conduit 46 to the pretreater to the outlet standpipe 53 thereof. These baffles are so arranged as to assure an average residence time of approximately one-half hour in the oxidation zone of the pretreater in order to control the agglomerated tendency of bituminous coal, when used, and concurrently to produce the necessary changes in the coal substance to allow its further treatment. In the pretreater, the volatile content of the coal, initially about 35%, is reduced to about 33%. The gases driven off consist mainly of carbon dioxide and a small amount of combustible material.

Gases leaving the fluidized bed in the pretreater pass upwardly through internally mounted cyclones, as at 54, for dust removal, the fines returning to the bed through downcomers, as at 55. The hot gases pass out of the pretreater through conduit 43, and thence into the fluidized feeder 41. Heat is recovered from the hot pretreater gases by exchange with the incoming coal in the fluidized feeder 41 as above explained. The hot gases fed to the fluidized feeder 41 over conduit 43, may be admixed with air, supplied over the connecting conduit 56 through valve 57, for burning part of the combustible portion of the hot gases under the grid 42 of the feeder 41. The gases in the fluidized feeder flow upwardly through a conduit 57a, to a fuel main 74 hereinafter referred to.

The pretreated coal flows from the pretreater 44 into the downcomer 53 and thence through a slide valve 60, regulated by a pneumatic level controller 61, connected in pipeline 62, tapped at its opposite ends to the pretreater 44, as shown, to provide a pressure differential which controls the slide valve 60 over pipeline 63, extending from the level controller 61 to the slide valve.

The pretreated coal passing through the slide valve 60, is fed over a transport conduit 64, extending to a coker 65. A small flow of air under pressure introduced into conduit 64 through connecting pipeline 66, transports the coal over conduit 64, and into the coker 65, wherein the coal is rapidly devolatilized to the desired coke product containing about 5% of volatile matter. Pipeline 66 contains a slide valve 67, for regulating the air flow under control of a differential pressure controller 68, connected to conduit 64 and to the slide valve 67 in the same manner above described with reference to controller 47. In this and in other respects the control of the coker 65, which is suitably lined to resist higher operating temperatures, is similar to the above described control of the pretreater 44.

Thus air is supplied to the coker over a pipeline 70, and preheated in a heater 71, similar to heater 50, and burns to char in the fluidized state, the pretreated coal introduced over conduit 64, the regulation being such as to maintain the bed at about 1550° F. The rich, hot gas evolved from the coal, diluted with the products of combustion, passes upwardly through internally mounted cyclones, as at 73, for dust removal, and thence into the gas main 74, connected over a pipeline 75, to the burner 22, of the precombustion chamber 11 of the rotary kiln 1. The excess gas over that required for the kiln combustion chamber, is vented to the stack 76, over a connecting pipeline 77 through a valve 78, controlled by a back pressure valve regulator 79.

From the coker 65, the devolatilized char flows through a downcomer 80, and through a slide valve 81, regulated by a level controller 82, similar to controller 61 of the pretreater. The fluidized char passes thence into a transport conduit 83, whence it may be delivered into a char mixer 84. A small amount of air under pressure introduced into conduit 83 through connecting pipeline 85, transports the char over conduit 83. Pipeline 85, contains a slide valve 86, for regulating the air flow under control of a differential pressure controller 87, similar to controller 68 above described.

The devolatilized char thus delivered to the mixer 84, is therein blended with the wet, recycle coke obtained from the reduced ore discharged at 88, from the rotary kiln 1, which is thereupon water quenched, as at 89, and thereafter ground and separated, as at 90, to provide the iron concentrate delivery 91, and recycle coke delivery 92, which latter is delivered to the mixer 84 as shown. In the mixer 84, the physical heat of the hot char from the coker 65, dries the wet, recycle coke from the rotary kiln, from whence the dried and blended admixture is delivered by conveyors, as indicated diagrammatically at 76a, into the recycle coke bin 26, at the feed end of the rotary kiln.

Alternatively, the hot, fluidized char from the coker may be delivered over a connecting pipeline 93, directly into the rotary kiln, as at 93a, thus to feed the hot char directly into the kiln along with the ore for preheating the same and expediting its reduction in the kiln. Valves 93a and 93b are provided in the pipeline 93 and in that leading to the mixer 84 for thus conveying the fluidized char as desired.

The gas produced by charring of the coal in the coker 65 can be augmented by the hot stack gas from stack 20 of the rotary kiln 1, by piping the same or a desired fraction thereof to the air inlet pipe 70 into the coker. Natural gas may be similarly introduced. Likewise steam may be thus introduced into the coker to generate additional gas by the producer gas reaction for control of the gas-solid product balance in case of a gas deficit.

Referring now to FIG. 2, the construction and operation of the rotary kiln 1 is the same as in FIG. 1, and hence requires no further description. The lower portion of FIG. 2 shows a vibrating grate stoker apparatus integrated with the rotary kiln operation, and delivering the hot combustible gases therefrom to the kiln combustion chamber. Referring thereto, the coal as previously crushed to pass 100% through 1½ inches with a minimum of fines, is belt conveyed over belt 30 into a magnetic separator 31, and the coal concentrates delivered thence via belt conveyor 32 and bucket elevator 33, into storage bin 35. The coal is fed thence through bin valve 36, onto weigh feeder 37, measuring the over-all supply of coal to the process. Belt conveyor 38 and bucket elevator 39, convey the coal thence to a screw conveyor system 100, which distributes the coal along the length of a hopper 101, and similarly onto a vibrating grate 102, water cooled, as at 103. The hopper 101 is provided with a guillotine gate 104, which is vertically adjustable for varying the rate of feed from the hopper onto the grate. The grate is inclined at an angle of 14° to the horizontal, and is vibrated by means of a timer-operated vibrator of conventional design, which induces a high frequency, low amplitude motion, causing the coal to move smoothly across the grate. Air for combustion is forced by a blower through a pipeline 105 and outlets 106, and thence upwardly through the grate 102 and burning coal bed 107. The grate vibration tends to maintain a porous and evenly distributed coal bed. Hoppers, as at 108, are mounted beneath the grate for reception of the ash.

The hot gases evolved from the charring operation pass upwardly through the stack 109, and thence in whole or in part, directly over a pipeline 110 to the burner 22 of the rotary kiln pre-combustion chamber 11, the stack 109 being provided with a damper 112, for regulating the gas flow over line 110.

The hot char flowing over the lower end of the grate 102, passes into a receiving hopper 113, from the base of which it is fed into a water-cooled, screw conveyor 114, and fed thence into a rotary mixer 115, wherein it is blended with the wet, recycle coke derived from the rotary kiln discharge via 89, 90 and 92 as above described with reference to FIG. 1. In the mixer, the hot char gives up its sensible heat by drying the recycled coke which contains about 15% water, the steam thus generated passing off through the mixer vent pipe 116. From the mixer 115, the mixed char and recycle coke is fed to a bucket elevator 116a, which delivers the same onto a screen 117. All material of —⅛″ passes through the screen, and is delivered thence to the recycle char bin 26 of the rotary kiln, by a suitable conveyor system indicated schematically at 118. The over-size material is delivered from the screen 117 to a mill 119, reduced to ⅛ x 100 mesh, and returned to the screen by conveyor means indicated schematically at 120.

Alternatively the screw conveyor 114 may be arranged to deliver the hot char to a crusher for crushing the same to a suitable particle size, and delivered thence directly onto the conveyor belt 27 at the input to the rotary kiln for feeding the hot char directly into the kiln along with the ore and recycle coke and also lime, where required in the ore reduction.

What is claimed is:

1. An integrated ore reduction and charring process, which comprises: reducing a metallic oxide ore in the presence of a low volatile, solid carbonaceous reductant and in the presence of hot combustible gases and a controlled amount of an oxygen-containing gas to provide a metallized ore reduction product admixed with an excess, unconsumed portion of said solid reductant, and concurrently therewith, subjecting a high volatile, solid carbonaceous raw material to a charring operation, by partial combustion thereof, to provide a low volatile, hot char with evolution of hot combustible gases, utilizing the hot gases thus obtained in the reduction of said ore, water quenching the said admixture of said ore reduction product and excess solid reductant, and separating, and admixing the hot char from said charring operation with said quenched and separated excess reductant.

2. A continuous, integrated ore reduction and charring process, which comprises: progressively feeding a metallic oxide ore and a low volatile, solid carbonaceous reductant, in comminuted form, into a rotary kiln, and progressively reducing said ore therein in the presence of hot combustible gases and a controlled amount of an oxygen-containing gas such as to reduce said ore to a metallized ore reduction product, and concurrently therewith, progressively charring a high volatile, solid carbonaceous raw material, to provide a low volatile, hot char with evolution of hot combustible gases, supplying said hot gases, as evolved, so said ore reduction kiln, and progressively feeding said hot char, while in the hot state, into said kiln along with said ore, thereby to utilize the sensible heat of said char to heat said ore.

3. A continuous, integrated ore reduction and charring process, which comprises: progressively feeding a metallic oxide ore and a low volatile, solid carbonaceous reductant, in comminuted form, into a rotary kiln, and progressively reducing said ore therein in the presence of hot combustible gases and a controlled amount of an oxygen-containing gas, such as to reduce said ore to a metallized ore reduction product in admixture with an excess, unconsumed portion of said carbonaceous reductant, progressively water quenching said admixture as discharged from said kiln and separating said ore product and excess reductant, and concurrently therewith, progressively charring a high volatile, solid carbonaceous raw material, to provide a low volatile, hot char with evolution of hot combustible gases, and supplying said hot gases, as evolved, to said ore reduction kiln, and admixing said hot char, as produced, with said quenched and separated excess reductant.

4. The method of progressively reducing iron ore and the like to the metallic state in a rotary kiln, which comprises: progressively fluidizing comminuted coal external to said kiln and charring the same in said fluidized state to provide a low volatile fluidized char with evolution of hot combustible gases, progressively feeding said ore together with fluidized hot char into said kiln while concurrently feeding said hot combustible gases thereto together with a controlled amount of oxygen-containing gas such as to reduce said ore to the metallic state without fusion.

References Cited in the file of this patent
UNITED STATES PATENTS

| | | |
|---|---|---|
| 2,151,849 | Hardy et al. | Mar. 28, 1938 |
| 2,534,051 | Nelson | Dec. 12, 1950 |
| 2,667,452 | Petit | Jan. 26, 1954 |
| 2,721,806 | Oberg et al. | Oct. 25, 1955 |
| 2,829,042 | Moklebust | Apr. 1, 1958 |
| 2,877,108 | Smith | Mar. 10, 1959 |
| 2,903,400 | Poindexter et al. | Sept. 8, 1959 |
| 2,986,460 | Babcock et al. | May 30, 1961 |